UNITED STATES PATENT OFFICE.

CHARLES W. SHARPLESS, OF PHILADELPHIA, PENNSYLVANIA.

IMPROVEMENT IN PRODUCING A WATER OR OIL PROOF COLORED OUTER SURFACE UPON PAPER, &c.

Specification forming part of Letters Patent No. 198,222, dated December 18, 1877; application filed March 21, 1877.

*To all whom it may concern:*

Be it known that I, CHARLES W. SHARPLESS, of the city of Philadelphia, State of Pennsylvania, have invented a new and useful Improvement in Preparing the Colored Surfaces of Papers and Card-Boards.

The following is a full and clear description of my invention, sufficient to enable those skilled in the art to which it relates to make and use the same.

It is a well-known fact that in the coloring or decorating of papers and card-boards, when the base or body or enameling agent of the coloring-matter is an earth or other like material, the card-boards or papers so colored present a dull finish or appearance, which, under many circumstances, it is desirable to varnish, print, paint, or bronze, or, when not varnished, it is desirable that the colored surface may be capable of being washed or brushed without danger of removing the coloring-matter therefrom.

It is further well known that colored surfaces of the class mentioned are liable, when moistened, to become defaced or to soil articles coming in contact with them, and, when painted in oil-paints, for the oil to run or soak outward and deface the outline of the picture or letters; also, when being impressed with bronze or gilt, unless previously sized, the ink used will soak into the body of the board through the colored surface, and leave the gilding or bronzing liable to rub off easily; and, also, when varnish is applied to such a surface, unless previously sized, the varnish will be absorbed in spots, leaving the surface of an uneven and unfinished appearance.

The object of my invention is to provide a means of making the coloring compounds oil and water proof, when used for card-boards or papers of all description for printing, painting, bronzing, or for decorative purposes, so as not to deface by moisture.

I have discovered that the coloring-matter usually employed for card-boards, wall or other papers, when composed of or containing one or more of the following elements—viz. paris-white, zinc, satin-white, ocher, Venetian red, orange mineral, ultramarine blue, lamp-black, blanc-fixe, whiting, umber, clay, chrome-yellow, and other coloring materials, and mixed in many instances one or more together, in the usual mode, compounding the same with glue—can be made water and practically oil proof by the introduction of a solution of iron or copperas into the compound.

In the use of copperas I find it expedient to use about eight (8) dry ounces, dissolved in water, added to a gallon of coloring mixture. The proportion of iron solution to be used will vary according to the particular solution used, the strength of which solution can be varied without changing the nature of my invention.

A less quantity of iron solution than that named for copperas is effective in some instances. The color is by these means rendered oil and water proof and fixed, and is capable of being varnished or painted with oil-paint, or both, without being previously sized, without injury or difficulty. Even when it is not varnished it may be dryly wiped, or washed even, without injury. The copperas or solution of iron I incorporate with the coloring compound before the latter is applied to the board or paper.

The color compounds hereinbefore referred to, when mixed with solution of iron, as set forth, are adapted to be used in the coloring of wall-papers, card-boards, or other colored papers to be printed, painted, or bronzed without any other preparation, and can be varnished, gilded, or bronzed without requiring to be sized.

I have found, also, that colors made waterproof with copperas or solution of iron upon a board or paper surface are capable of being printed on (without being sized) with printer's ink, as well as bronze, to great advantage, being less likely to blur and become defaced, and they receive and retain upon the surface with clearness all kinds of printing or bronze-printing more fixedly than upon the ordinary colored surface of cards or paper, and may be washed with clean water without affecting the surface or printing or the painting, when the latter is oil. If it is a water-color the painting may be rubbed off.

The difficulty in painting with oil-paint upon such surfaces not previously carefully sized is that the colored surface absorbs the oil from the paint, and also that the oil runs outward from the paint into the surrounding plain surface, thus giving the painting a very objectionablydiscolored surrounding; but a colored surface prepared as I have herein designated avoids this, as the absorption of the oil is practically nullified, and the painting lies upon the extreme outer surface.

I am well aware that in a work upon the "Manufacture of Paper," by Hoffman, and in other works, methods of producing colored paper by mixing compounds of coloring-matter and copperas with the pulp before its manufacture into paper are set forth. These methods contemplate producing a paper thoroughly saturated or dyed with the coloring-matter, and neither look to preparing a simple waterproof colored surface upon plain paper or cardboard, nor to producing water-proof colored prints or figures upon such surfaces, nor to the overcoming of those objections which I have overcome in my process. Therefore I do not claim those methods; but What I do claim, and desire to secure by Letters Patent, is—

The process of producing a water or oil proof colored outer surface (by an outer layer of color) upon paper or card-board by first mixing with the coloring-matter which is to form such surface a solution of copperas or iron, and then applying this compound to the surface of the paper or card-board, substantially as described.

CHARLES W. SHARPLESS.

Witnesses:
W. C. STRAWBRIDGE,
JOHN JOLLEY, Jr.